United States Patent Office 3,772,357
Patented Nov. 13, 1973

3,772,357
ORGANOBORON COMPOUND
Hiroyoshi Hamanaka, Tokyo, Japan, assignor to Toho Kagaku Kogyo Kabushiki Kaisha, Tokyo, Japan
No Drawing. Filed Dec. 4, 1969, Ser. No. 882,342
Int. Cl. C07d *107/02;* C08k *1/60;* B01f *17/34*
U.S. Cl. 260—410.7
4 Claims

ABSTRACT OF THE DISCLOSURE

The present invention relates to an organoboron compound having a new structure, more specifically to an organoboron compound characterized by a dislocation of its structure which is normally in non-ionic condition but may assume an anionic condition chracterized by surface activity; to a process for producing this organoboron compound, and to its application as an antistatic agent, emulsifier and heat-resistance improving agent for synthetic resins.

SUMMARY OF THE INVENTION

The present invention relates to a process for producing a new organoboron compound having in its molecules at least one bond of the following type:

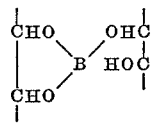

and one carboxylic ester bond, by synthesizing a triester borate by heating and a dehydration esterification reaction between boric acid and a polyhydric alcohol having vicinal hydroxyl radicals, or through an ester interchange reaction of a lower alcohol triester borate and then performing the reaction between the residual hydroxyl radical and a carboxylic acid or a carboxylic acid lower alcohol ester; by reacting a carboxylic acid polyhydric alcohol ester containing a residual vicinal hydroxyl radical with boric acid or a boric acid lower alcohol triester; by reacting boric acid with a polyol-carboxylic acid ester; or by a combination of any of these esterification reactions.

The present invention relates more particularly to a surface-active organoboron compound having the following general structure and formula in a nucleophilic field:

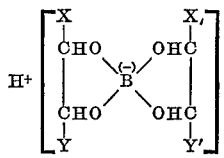

which normally assumes the following structure in the absence of a nucleophilic field:

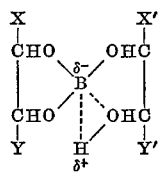

wherein X, X', Y, Y' are selected from the group consisting of hydrogen, —CH$_2$, —C$_2$H$_5$, —CH$_2$OH(CHOH)$_n$—, in which $n=0$, 1, 2, 3, and a group containing at least one

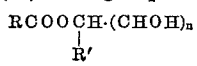

radical (in which $n=0$, 1, 2, 3, R is an alkyl having 7 to 21 carbon atoms; and R' is H, —CH$_2$—, —CHOH—,

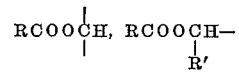

or one of the other radicals from among which X, X', Y and Y' may be selected); and at least one of X, X', Y, Y' is a group including an

radical.

There are practically no known organoboron compounds capable of acting as surfactants which are useful as antistatic agents or emulsifiers, except for the compound disclosed in Japanese patent publication No. Sho 43/14,322, which is known as an antifogging agent for synthetic resins and has the following structure and anionic properties:

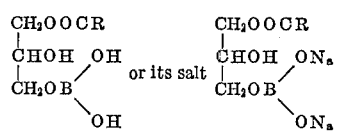

in which R is an alkly having 7 to 21 carbon atoms.

The compound obtained by the process of this invention is, unlike the above-mentioned prior art organoboron compound, non-ionic in its normal state, but in a nucleophilic field its radical:

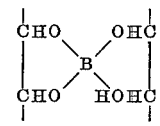

assumes a complex ionic structure which reacts as if it has the following ionic formula:

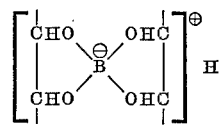

which compound contains a hydrophilic radical which produces one hydrogen ion by assuming a complex ion structure in which boron is the central atom and oxygen atoms derived from alcoholic OH radicals act as ligands.

These compounds are lipophilic nonionic surface active agents which can form:

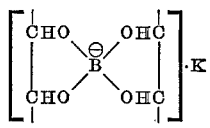

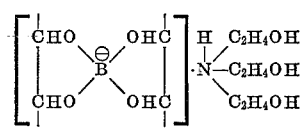

when reacted with an alkali or amine base which forms the nucleophilic field.

These compounds are not only useful when used alone as emulsifiers or as antistatic agents for synthetic resins, but they also can be used in combination with other surfactants. Here the nucleophilic field is a system containing a nitrogen compound with a single or lone pair of electrons as typified by amines. Thus the organoboron compound obtainable by the process of this invention is characterized by its ability to assume a non-ionic or anionic structure depending on the use to which it is to be put. In combination with a cationic surfactant, it can serve as a non-ionic surface-active agent; and when it is to be used as an emulsifier an appropriate HLB or hydrophilelipophile balance adjustment can be attained by neutralizing the compound totally or partially with alkali or amine to transform it into a blend of non-ionic or anionic portions or render it wholly anionic.

The dislocation of the structure characterizing the organoboron compound of this invention has been verified by the fact that in neutralization titration using an alcoholic solution of sodium hydroxide in a mixed solvent containing 50% alcohol and 50% ether, the product obtained by carrying out the process of this invention can invariably be neutralized with the consumption of nearly one gram equivalent of sodium hydroxide as calculated from its probable structural formula. Also this dislocation of the structure can be confirmed by the fact that the O-H stretching vibration in infra-red spectra in liquid paraffin of the product according to this invention has a broad band associated with a hydrogen bond at a wave-number value of around 3500 cm.$^{-1}$, but in pyridin an absorption that appears to represent a sharp N-H stretching vibration is exhibited, and at a wave-number value of around 1850-2000 cm.$^{-1}$ an absorption that appears to represent a new B-H stretching vibration appears. It can also be confirmed by the fact that the product according to this invention shows a hydrogen signal due to the alcoholic OH at around 5 p.p.m. in the nuclear magnetic resonance spectra in carbon tetrachloride, but in pyridin it shows at 1.8 p.p.m. a new signal supposedly due to both an NH bond and a BH bond, with the hydrogen signal due to the alcoholic OH disappearing.

In this invention, the polyhydric alcohol having vicinal hydroxyl radicals, which is to be reacted with boric acid, can be for example ethylene glycol, propylene glycol, butylene glycol, glycerin, sorbitan, or sorbitol. The triester borate forming reaction between such a polyhydric alcohol and boric acid can be easily carried out by heating them at 70-300° C., preferably at 180-210°, under atmospheric or subatmospheric pressure. The mol ratio between the boric acid and this polyhydric alcohol should be one mol of boric acid to two mols of at least one polyhydric alcohol; so that a total of 5 or more than 5 hydroxyl radicals should be employed per atom of boron. Accordingly a dihydric alcohol such as ethylene glycol or propylene glycol cannot be employed alone but must be combined in use with at least a trihydric alcohol. When an ester interchange is to be made between a lower alcohol triester borate and said polyhydric alcohol, compounds such as trimethyl borate, triethyl borate or triisopropyl borate are used. Moreover, their reactions do not require a common catalyst for esterification; the reaction can be more easily completed during the introduction of inert gases such as nitrogen gas or carbon dioxide.

It is also possible to use a solvent such as xylene or toluene during esterification and then distill the solvent after azeotropic dehydration.

Among the carboxylic acids, suitable for reaction with the resulting polyhydric alcohol triborate are lauric acid, palmitic acid, stearic acid, oleic acid, behenic acid, etc. This esterfiication can be easily effected by heating to cause dehydration at 70-250° or preferably at 180-210° C. under atmospheric or sub-atmospheric pressure. Said carboxylic acid may be dealcoholized by heating it with a lower alcohol-substituted carboxylic ester; and this reaction can be completed without any esterifying catalyst, such as alkalis, alkaline metals, acids, etc. In this reaction, too, an inert gas such as nitrogen gas or carbon dioxide may be introduced or an azeotropic solvent for dehydration may be utilized.

As indicated above, the carboxylic acid reactant to be used after producing the reaction between the polyhydric alcohol having more than one residual pair of vicinal hydroxyl radicals and boric acid should be one having saturated or unsaturated fatty alkyl or alkylene radicals having 8 to 22 carbon atoms; and the same polyhydric alcohol mentioned above should be employed. The reaction should use one mol of boric acid to two mols of at least one carboxylic ester or one mol of basic acid to a mixture of one or two mols of at least one carboxylic ester and less than one mol of at least one polyhydric alcohol. This reaction can easily take place at 70-250° or preferably at 180-210° C. under atmospheric or sub-atmospheric pressure, the other reacting conditions being the same as for the reaction between polyhydric alcohol and boric acid.

Several preferred examples of methods of carrying out this invention will now be given:

EXAMPLE 1

61.8 g. (one mol) of bori cacid and 184.2 g. (two mols) of glycerin were put into a four necked flask equipped with a stirrer, a thermometer, a gas inlet tube and a reflux condenser having a water measuring tube; and the mixture was dehydrated under a nitrogen atmosphere at 180-210° C. in four hours, producing 54 g. of water and a colorless clear liquid triester glycerol borate. Neutralization titration of this liquid is a mixed solvent containing equal parts of alcohol and ether using an alcoholic potassium hydroxide solution showed that said liquid has an acid value of 288 (theoretically 292). Then 288.4 g. (two mols) of caprylic acid were added to said liquid in the same vessel and dehydrated at 200-210° C. under a nitrogen atmosphere for five hours, producing 35.5 g. of water and a reddish brown oily substance. This oleaginous reaction product was subjected to the same neutralization titration as above and showed an acid value of 120.8 (theoretically 126).

EXAMPLE 2

61.8 g. (one mol) of boric acid, 92.1 g. (one mol) of glycerin and 62.1 g. (one mol) of ethylene glycol were reacted under a nitrogen atmospher at 180-190° C. for five hours, as in Example 1, thereby producing an approximately theoretical amount of water and a colorless clear liquid triester borate having an acid value of 342.5. Then 200.3 g. (one mlo) of lauric acid was added to the reaction product and dehydrated at 200-220° C. for five hours, thereby producing a light yellow oily substance having an acid value of 159.7. From the infra-red spectra of this product, it was confirmed that the lauric acid employed had turned almost completely into the lauric acid ester.

EXAMPLE 3

61.8 g. (one mol) of boric acid and 184.2 g. (two mols) of glycerin were dehydrated under a ntroge natmosphere at 180-210° C. nearly to the theoretical amount over a period of four hours, thereby producing a colorless clear liquid triester borate having an acid vlaue of 289.5. 564 g. of oleic acid reactant and 200 g. of xylene were added theerto as an azeotropic solvent and dehydration esterification to nearly the theoretical amount was effected through a five-hour reaction at 140° C. Thereafter, xylene was eliminated by distillation under sub-atmsopheric pressure, yielding a yellow oily product having an acid value of 75.8.

EXAMPLE 4

123.7 g. (two mols) of boric acid and 368.4 g. (four mols) of glycerin were dehydrated nearly to the theoretical amount in a four hour esterification reaction at 180-210° C. under a nitrogen atmosphere, thereby producing a colorless clear liquid triester borate having an acid value of 290. 852 g. (three mols) of stearic acid was added thereto and the mixture dehydrated nearly to the theoretical amount in about eight hours at 220-250° C. under a nitrogen atmosphere. The reaction product was a light yellow wax having an acid value of 92.1.

EXAMPLE 5

192 g. of triester borate obtained as in Example 4 was put into a four-necked flask equipped with a stirrer, a thermometer and a vacuum apparatus. Using 428.6 g. (two mols) of metyhlester of lauric acid, a six-hour demethanolizing reaction was carried out at 75° C., 5-10 mm. Hg. The reaction product was a light yellow oily substance having an acid value of 146.

EXAMPLE 6

61.8 g. (one mol) of boric acid, 92.1 g. (one mole) of glycerin and 76.1 g. (one mol) of propylene glycol were dehydrated nearly to the theoretical amount in a five hour reaction at 180–185° C. under a nitrogen atmosphere. The triester borate obtained was a colorless clear liquid having an acid value of 315 (theoretically 319). Then 340.6 g. (one mol) of industrial behenic acid was added to the triester borate and dehydrated nearly to the theoretical amount in a twelve hour reaction at 220–235° C. under a nitrogen atmosphere, yielding a yellow wax having an acid value of 106.

EXAMPLE 7

Using the same apparatus as in Example 1, 61.8 g. (one mol) of boric acid and 692 g. (two mols) of industrial sorbitan monolaurate were dehydrated nearly to the theoretical amount in a six-hour reaction at 180–200° C. under a nitrogen atmsophere. The reaction product was a light yellow paste having an acid value of 65.5.

EXAMPLE 8

123.7 g. (two mols) of boric acid, 860 g. (two mols) of industrial sorbitan monostearate, and 184.2 g. (two mols) of glycerin were introduced into the same apparatus as used in Example 1 and dehydrated nearly to the theoretical amount in an eight hour reaction at 180–210° C. under a nitrogen atmosphere. The reaction product was a light yellow wax having an acid vlaue of 78.

EXAMPLE 9

61.8 g. (one mol) of boric acid, and 660.2 g. (two mols) of glycerin monopalmitate were introduced into the same apparatus as employed in Example 1 and dehydrated nearly to the theoretical amount in a ten hour reaction at 170–180° C. under a nitrogen atmosphere. The reaction product was a light yellow wax having an acid value of 84.

EXAMPLE 10

184.2 g. (two mols) of glycerin and 164.8 g. (one mol) of 63% methanol solution of trimethyl borate were introduced into the same apparatus used in Example 1, and under a ntrogen atmosphere 157 g. of methanol was distilled at 70–90° C. during the etser interchange reaction. The acid value of the colorless clear liquid obtained was 281 (theoretical value 292). 423 g. (1.5 mols) of oleic acid was added to said liquid. The mixture was heated and esterified for about five hours at 220° C. under a nitrogen atmosphere. After yielding 27 g. of water, it was cooled. The reaction product was an orange oily product having an acid value of 86.

EXAMPLE 11

103.8 g. (0.3 mol) of sorbitan monolaurate (industrial grade) and 28 g. (0.15 mol) of triisopropyl borate were introduced into the same apparatus as used in Example 1, and ester interchange was effected in a nitrogen gas stream at 180° C. over about three hours. After distilling off 27 g. of isopropyl alcohol, a yellow viscous liquid was obtained, the acid value of which, as measured, was 71.5.

The reaction products in these examples, when subjected to neutralization titration with potassium hydroxide, had an acid value approximately equal to the theoretical acid value for an anionic compound, except that in Examples 7 and 8, this value was about 20% lower than the theoretical value. This is presumably due to the fact that the industrial sorbitan fatty acid ester is not pure sorbitan fatty acid ester, but includes sorbide fatty acid ester, etc.

The products according to the invention have various applications as produced in the non-ionic state, or when treated with an amine or alkali to make it anionic, or when coupled with other surface active agents. Particularly, its performance as an emulsifier or antistatic agent for synthetic resins is illustrated by the following test results:

(1) EXAMPLES OF USE AS AN EMULSIFIER (A) 3 g. of beeswax, 10 g. of 125° F. parafin, 15 g. of vaseline, 41 g. of liquid paraffin and 5 g. of the reaction product of Example 3, were put into a 200 cc. beaker. The mixture was heated to 75–80° C., melted, and evenly mixed. Then 26 g. of water at 70° C. was poured in while slowly stirring, and the mixture thereafter cooled. The resulting emulsion was a homogeneous stable cream, indicative of the strong emulsifying ability of the reaction product of Example 3.

(B) 38 g. of liquid paraffin, 4 g. of beeswax, 2 g. of vaseline, 4 g. of glycerin and 12 g. of the reaction product of Example 8 were introduced into a 200 cc. beaker. The mixture was heated until it melted at 75–80° C., and homogeneously mixed. 40 g. of water at 70° C. was then poured in slowly while stirring, and the mixture cooled. The resulting emulsion was a homogeneous stable cream, indicative of the strong emulsifying ability of the reaction product of Example 8.

(C) 40 g. of 125° F. paraffin wax, 3 g. of poly(20) oxyethylene sorbitan-di-stearate and 4 g. of the reaction product of Example 9 were mixed in a 200 cc. beaker and heated to 90° C. until melted. 1.6 g. of a 25% aqueous solution of KOH at 80° C. and 60 g. of hot water at 80° C. were successively added while stirring slowly, and the mixture was then cooled. The resulting emulsion was found to be homogeneous, thus indicating the satisfactory emulsifying effect exhibited by the substance of Example 9 neutralized with potassium hydroxide and coupled in use with poly(20)oxyethylene sorbitan-di-stearate.

(D) The emulsifying effect of the reaction product of Example 10 on the agricultural chemical DDVP (O,O-dimethyl-O-2,2-dichlorovinyl phosphate) was compared with that of known compounds as follows:

(Emulsifying Formula A)

| | Parts |
|---|---|
| Poly(6 mol)oxyethylene lauryl ether | 50 |
| Poly(10 mol)oxyethylene nonylphenylether | 40 |
| Sorbitan sesquiolate | 10 |
| Total | 100 |

(Emulsifying Formula B)

| | |
|---|---|
| Poly(6 mol) oxyethylene lauryl ether | 50 |
| Poly(10 mol) oxyethylene nonylphenylether | 40 |
| Reaction product of Example 10 | 10 |
| Total | 100 |

Whereas a solution containing 1 part of a mixture of 4 g. of a 50% kerosene solution of DDVP and 1 g. of formula A in 1000 parts of water separated at 20° C. in about 10 hours, a solution containing 1 part of a mixture of 4 g. of a 50% kerosene solution of DDVP and 1 g. of compound in B in 1000 parts of water remained stable for more than 48 hours at 20° C.

(2) EXAMPLES OF USE AS AN ANTISTATIC AGENT (A) The reaction product of Example 4 was applied as an antistatic agent to methylmethacrylate resin.

Compound ratio

Methylmethacrylate monomer (MMA): 100 parts
Reaction product of Example 4:1, 2, 3, 4 parts Process Monomer casting mold method: polymerization 90° C., 10 hrs.; ripening 120° C., 2 hrs.

Antistatic effect (1) The surface intrinsic electrical resistance as measured at 20° C. and 55% relative humidity was as below:

| Amount of addition | Surface intrinsic electrical resistance in ohms |
|---|---|
| Control | $3.61 \times 10^{16}$ |
| Parts: | |
| 1 | $3.14 \times 10^{13}$ |
| 2 | $1.28 \times 10^{12}$ |
| 3 | $1.18 \times 10^{11}$ |
| 4 | $1.35 \times 10^{10}$ |

(2) The chrage extinction curve for an applied voltage of 5000 v. measured at 20° C., 55% relative humidity was as below:

| Time treated (min.) | 20 | 40 | 60 | 80 | 100 | 120 |
|---|---|---|---|---|---|---|
| Sample: | | | | | | |
| Control | Colorless | Colorless | Colorless | Colorless | Light yellow | Light yellow. |
| Compound: | | | | | | |
| (1) | Light yellow | Light yellow | Dark brown | Black | Black | Black. |
| (2) | Colorless | do | Light yellow | Light brown | Red | Dark brown. |

| | Saturation charge (v.) | Half life of charge (sec.) |
|---|---|---|
| Control | 2,500 | |
| Amount of addition, parts: | | |
| 1 | 1,200 | 15 |
| 2 | 1,150 | 7 |
| 3 | 900 | 2.7 |
| 4 | 750 | 1.4 |

As shown above, the product of this invention showed a remarkable antistatic effect on MMA resin, but did not adversely affect the heat stability and transparency of the molded product.

(B) The reaction product of Example 2 was applied as an antistatic agent to polyvinylchloride (PVC) resin.

Compound ratio

PVC resin (P=450): 100 parts
DOP (dioctyl phthalate): 40 parts
Cadmium stearate: 0.5 part
Barium stearate: 0.5 part
Reaction product of Example 2: 1 part

Process

Calender mold method: roll temperature 170° C.; mixing 5 minutes

Heat stability test

At 170° C., Geer's oven was used for testing.

| Time treated (min.) | 20 | 40 | 60 | 80 | 100 | 120 |
|---|---|---|---|---|---|---|
| Sample: | | | | | | |
| Control | Colorless | Colorless | Colorless | Light yellow | Light yellow | Yellow. |
| Reaction product of Example 2 | do | do | do | Colorless | do | Light yellow. |

Antistatic effect

Surface intrinsic electrical resistance as measured at 20° C., 55% relative humidity was as follows:

Control: $3.26 \times 10^{15}$ ohm.
Reaction product of Example 2: $5.65 \times 10^{12}$ ohm.

Thus, the product of this invention was proved to have a remarkable antistatic effect on soft PVC resin and to be satisfactorily stable to heat.

(C) The reaction product of Example 2 was mixed with a cationic antistatic agent and applied to PVC resin.

| Compound ratio | (2) | (1) |
|---|---|---|
| PVC resin (P=1,100), parts | 100 | 100 |
| T.B.T.L. (tributyl tin laurate), part | 1 | 1 |
| Cationic antistatic agent,[1] part | 1 | 1 |
| Reaction product of Example 2, part | 1 | |

[1] See the following:

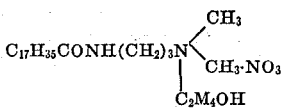

Process

Extrusion mold method: 140° C., 5 min.

Heat stability test

At 170° C., Geer's oven was used for testing.

Antistatic effect

Charge extinction curve of for an applied voltage of 5000 v. measured at 20° C., 55% relative humidity was as below:

| Sample | Surface intrinsic electrical resistance (ohm) | Saturation (v.) | Half life of charge (sec.) |
|---|---|---|---|
| Control | $6.68 \times 10^{16}$ | 2,000 | |
| Compound: | | | |
| (1) | $8.82 \times 10^{12}$ | 550 | 6 |
| (2) | $6.05 \times 10^{12}$ | 450 | 3.5 |

As demonstrated above, the product of this invention is itself highly stable when heated and, when used with a cationic antistatic agent, which is itself less stable when heated, it can improve the heat stability of the mixture.

(3) EXPERIMENT AS TO HEAT STABILITY

The product of this invention excels the conventional surface active agents in heat stability and this superiority is maintained even when an unsaturated fatty acid is used. The following are the results of a comparative heat stability test comparing the reaction product of Example 3 and sorbitan-di-oleate.

Test procedure 100 g. of the sample was introduced into a 200 cc. beaker and treated at 180° C. Then its color tone and weight loss were measured.

Results

| Specimens | Items measured | Before treatment | Time treated | | | |
|---|---|---|---|---|---|---|
| | | | 15 min. | 30 min. | 45 min. | 60 min. |
| Reaction product of Example 3 | Color tone (Gardner color standard number) | No. 5 | No. 5 | No. 7 | No. 7 | No. 8 |
| | Weight loss, percent | 0 | 0.11 | 0.95 | 1.28 | 1.83 |
| Sorbitan di-oleate | Color tone (Gardner color standard number) | No. 8 | No. 9 | No. 11 | No. 13 | No. 14 |
| | Weight loss, percent | 0 | 0.15 | 0.97 | 1.52 | 2.02 |

The following compounds illustrate the compounds of this invention:

(1) 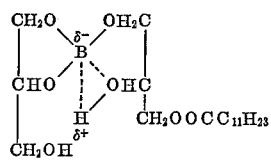

(2) 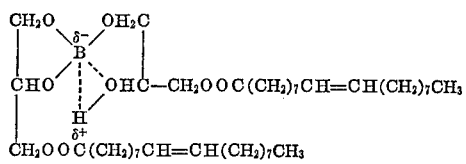

(3) 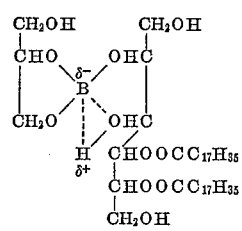

(4) 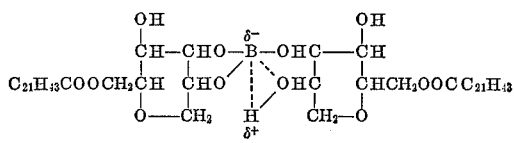

What is claimed is:

1. A process for the production of a surface active organoboron compound having a hydrophilic radical which assumes a complex ion structure in which the oxygen atoms of the alcoholic OH radicals behave as ligands around a boron atom in a neucleophilic field, and has the formula

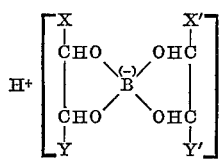

but in the absence of a nucleophilic field this compound resumes its normal structure:

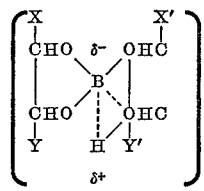

wherein X, X', Y, Y' are selected from the group consisting of hydrogen,

—$CH_3$, $C_2H_5$, —$C_2OH$ or —$CH_2OOCR$ in which R is an alkyl radical having 7 to 21 carbon atoms, and in the case where one of X and Y, or X' and Y' is $CH_3$, $C_2H_5$, —$CH_2OH$ and —$CH_2OOCR$, the other is hydrogen; and at least one of X, X', Y and Y' is

—$CH_2OOCR$ the process comprising:

(1) in a first stage reaction to produce a polyhydric alcohol triester borate, reacting a total of two mols of one, or more than one type of polyhydric alcohol containing vicinal hydroxyl groups with one mol of boric acid or a lower alcohol triester borate, so that there is present at least 5 hydroxyl radicals of the specified polyhydric alcohol per atom of boron; and (2) in a second stage reaction to obtain the ultimate product, reacting one to two mols of a carboxylic acid containing a saturated or unsaturated alkyl radical having from 7 to 21 carbon atoms or a lower alcohol ester of the specified carboxylic acid with one mol of the specified polyhydric alcohol triester borate produced in the first stage.

2. The process of claim 1 in which the reactants in stage (1) are glycerin and boric acid and the carboxylic acid reactant in step (2) is stearic acid.

3. The process of claim 1 in which the reactants in stage (1) are trimethylborate and glycerin and the carboxylic acid reactant in stage (2) is oleic acid.

4. The process of claim 1 in which the reactants in stage 1 are glycerin and boric acid and the carboxylic acid reactant in Stage 2 is lauric acid.

References Cited
UNITED STATES PATENTS

| | | | |
|---|---|---|---|
| 3,598,855 | 8/1971 | Cyba | 260—462 R |
| 3,373,170 | 3/1968 | Jones | 260—345.8 |
| 2,209,634 | 7/1940 | Muncie | 260—458 |
| 2,989,469 | 6/1961 | Darling et al. | 252—49.6 |

LEWIS GOTTS, Primary Examiner
D. G. RIVERS, Assistant Examiner

U.S. Cl. X.R.

252—356; 260—45.85; 89.5 A. 92.8 R. 345.8. 410.6; 424—219

UNITED STATES PATENT OFFICE
CERTIFICATE OF CORRECTION

Patent No. 3,772,357    Dated November 13, 1973

Inventor(s) HIROYOSHI HAMANAKA

It is certified that error appears in the above-identified patent and that said Letters Patent are hereby corrected as shown below:

[30]     Foreign Application Priority Data
     December 6, 1968     Japan.......Sho 43-89266

Signed and sealed this 23rd day of April 1974.

(SEAL)
Attest:

EDWARD M.FLETCHER,JR.                C. MARSHALL DANN
Attesting Officer                    Commissioner of Patents